United States Patent
Claus et al.

(10) Patent No.: US 9,897,038 B2
(45) Date of Patent: Feb. 20, 2018

(54) SEALING SYSTEM

(71) Applicant: REINZ-DICHTUNGS-GMBH, Neu-Ulm (DE)

(72) Inventors: Oliver Claus, Laichingen (DE); Steffen Erthle, Dornstadt (DE); Kurt Hoehe, Langenau (DE); Ahmet Oruc, Nattheim (DE); Hans Waldvogel, Krumbach (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 0 days.

(21) Appl. No.: 14/392,112

(22) PCT Filed: Jun. 5, 2014

(86) PCT No.: PCT/EP2014/061727
§ 371 (c)(1),
(2) Date: Nov. 24, 2015

(87) PCT Pub. No.: WO2014/195417
PCT Pub. Date: Dec. 11, 2014

(65) Prior Publication Data
US 2016/0090941 A1 Mar. 31, 2016

(30) Foreign Application Priority Data
Jun. 7, 2013 (DE) .................... 20 2013 005 210 U

(51) Int. Cl.
*F02F 11/00* (2006.01)
*F16J 15/08* (2006.01)

(52) U.S. Cl.
CPC ......... *F02F 11/002* (2013.01); *F16J 15/0806* (2013.01); *F16J 15/0818* (2013.01); *F16J 15/0887* (2013.01)

(58) Field of Classification Search
CPC .. F16J 15/0887; F16J 15/0893; F16J 15/0881; F16J 15/022; F16J 15/00; F16J 15/0806; F16J 15/0818
See application file for complete search history.

(56) References Cited

U.S. PATENT DOCUMENTS

| | | | |
|---|---|---|---|
| 1,721,326 A * | 7/1929 | Wilson | F16B 43/00 277/649 |
| 2,291,945 A * | 8/1942 | Bowers | F16J 9/20 277/464 |

(Continued)

FOREIGN PATENT DOCUMENTS

| | | |
|---|---|---|
| DE | 19503285 A1 | 8/1996 |
| DE | 10256489 A1 | 7/2003 |

(Continued)

OTHER PUBLICATIONS

European Patent Office; The International Search Report of PCT/EP2014/06727; Jul. 7, 2014; 3 pages; European Patent Office, Rijswijk, Netherlands.

(Continued)

*Primary Examiner* — Kristina Fulton
*Assistant Examiner* — Lakshmi Koneru
(74) *Attorney, Agent, or Firm* — Marshall & Melhorn, LLC

(57) ABSTRACT

The invention relates to a sealing system consisting of a first part and a second part and at least a passage opening extending in both parts, in particular a passage opening for fluids such as hot combustion gases from combustion engines as well as a corresponding metallic flat gasket such that the sealing system comprises or consists of a first part and a second part with the first part and the second part being compressed against each other at a joint contact surface and comprising at least one passage opening in the contact surface, which protrudes into the first and/or second part, an (Continued)

annular groove, which is delimited by the first and the second part and which encircles the passage opening, with the first and second part in the area at least radially outside of the groove come to rest one on the other.

16 Claims, 9 Drawing Sheets

(56) References Cited

U.S. PATENT DOCUMENTS

| | | | |
|---|---|---|---|
| 3,012,802 A | 12/1961 | Waite | |
| 3,240,501 A * | 3/1966 | Smith | F16L 17/08 277/589 |
| 3,289,953 A * | 12/1966 | Farrell, Jr. | E03C 1/2665 184/109 |
| 3,537,733 A * | 11/1970 | Martin | F16L 19/0218 277/625 |
| 3,595,588 A * | 7/1971 | Rode | F16J 15/0887 277/647 |
| 3,751,048 A * | 8/1973 | Rode | F16J 15/0887 277/649 |
| 3,754,766 A * | 8/1973 | Asplund | F16J 15/0887 277/644 |
| 4,289,318 A * | 9/1981 | Cather, Jr. | F03B 11/006 277/569 |
| 4,457,523 A * | 7/1984 | Halling | F16J 15/021 277/644 |
| 4,854,600 A * | 8/1989 | Halling | F16J 15/021 277/626 |
| 4,857,668 A * | 8/1989 | Buonanno | H05K 9/0015 174/354 |
| 5,221,097 A | 6/1993 | Ishikawa et al. | |
| 5,240,263 A | 8/1993 | Nicholson | |
| 5,954,343 A * | 9/1999 | Sumida | F02M 61/14 277/434 |
| 5,997,008 A * | 12/1999 | Pflug | F16L 19/0218 277/608 |
| 6,916,024 B2 | 7/2005 | Hanashima et al. | |
| 7,004,478 B2 | 2/2006 | Spence et al. | |
| 7,832,376 B2 * | 11/2010 | Mueller | F02M 61/14 123/470 |
| 9,140,388 B2 * | 9/2015 | Baca | F16J 15/025 |
| 2007/0020417 A1 * | 1/2007 | Murakami | B29C 61/06 428/35.7 |
| 2010/0001152 A1 * | 1/2010 | Golle | F16B 5/0642 248/220.21 |
| 2010/0187771 A1 | 7/2010 | Waltenberg et al. | |
| 2014/0183825 A1 * | 7/2014 | Chuong | F16J 15/0887 277/411 |
| 2016/0115811 A1 * | 4/2016 | Davis | F16J 15/0887 277/591 |

FOREIGN PATENT DOCUMENTS

| | | |
|---|---|---|
| DE | 60028523 T2 | 12/2006 |
| DE | 102007019330 A1 | 10/2008 |
| DE | 2202011103439 U1 | 7/2012 |
| EP | 1113200 B1 | 6/2006 |
| FR | 2036502 A5 | 12/1970 |
| FR | 2743612 A1 | 7/1997 |

OTHER PUBLICATIONS

German Patent Office; German Search Report; Jan. 14, 2014; 7 pages; German Patent Office, Munich, Germany.

* cited by examiner

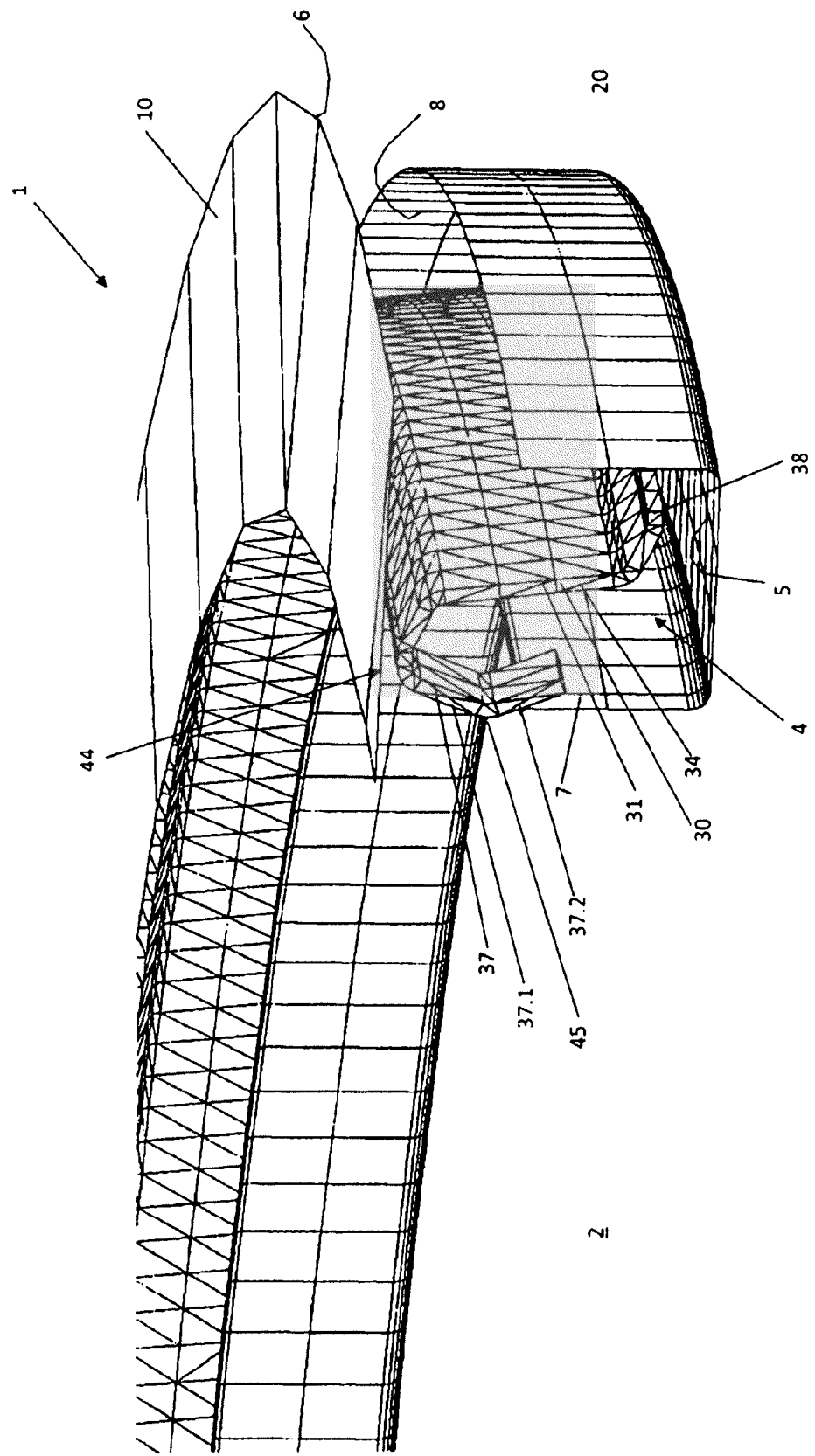
Fig. 2-a

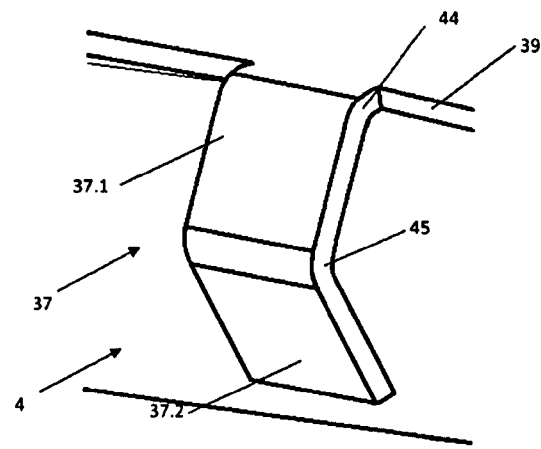
Fig. 2-b
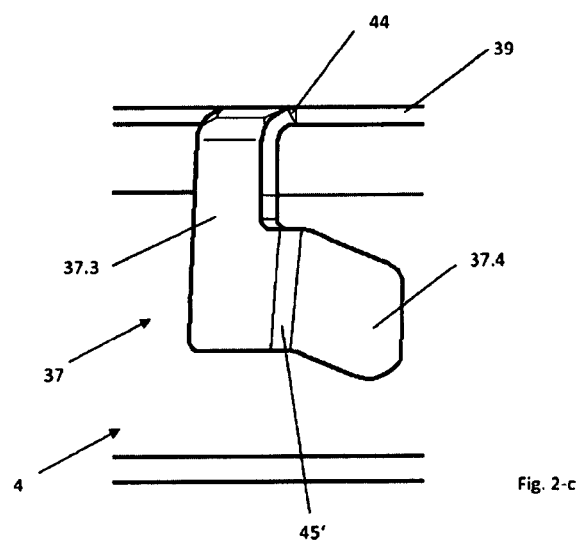
Fig. 2-c

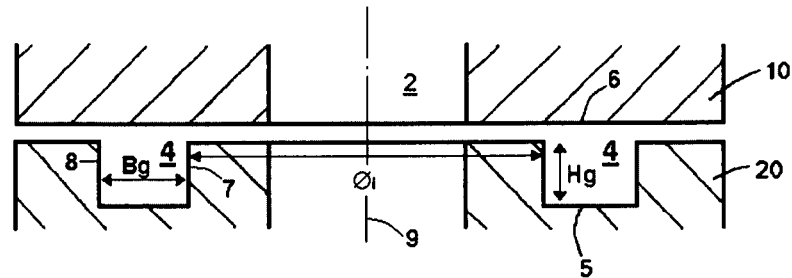
Fig. 3-a
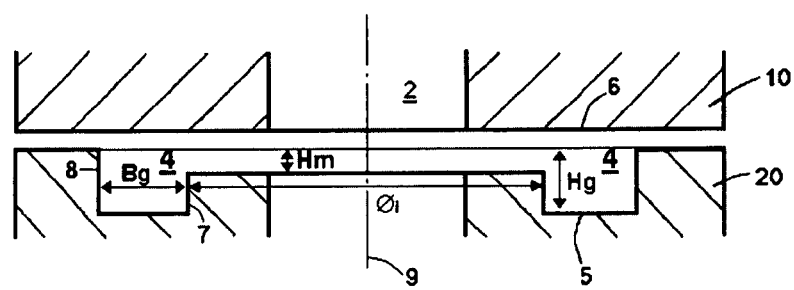
Fig. 3-b
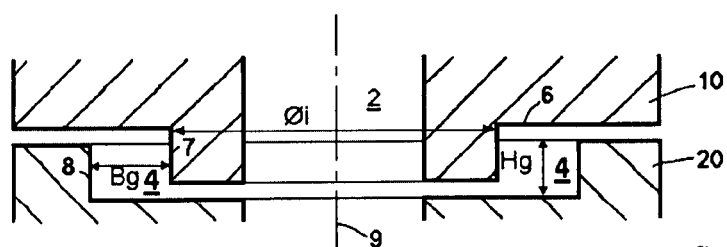
Fig. 3-c

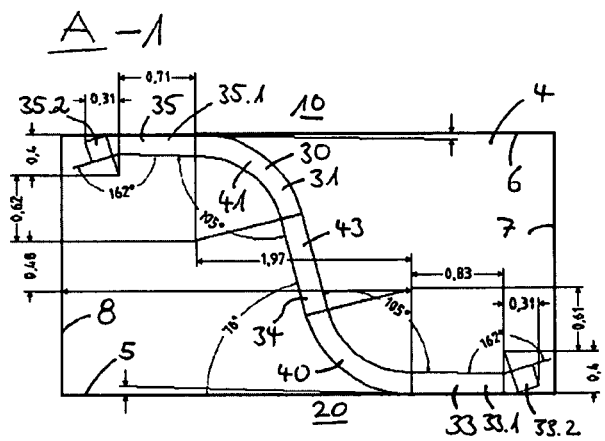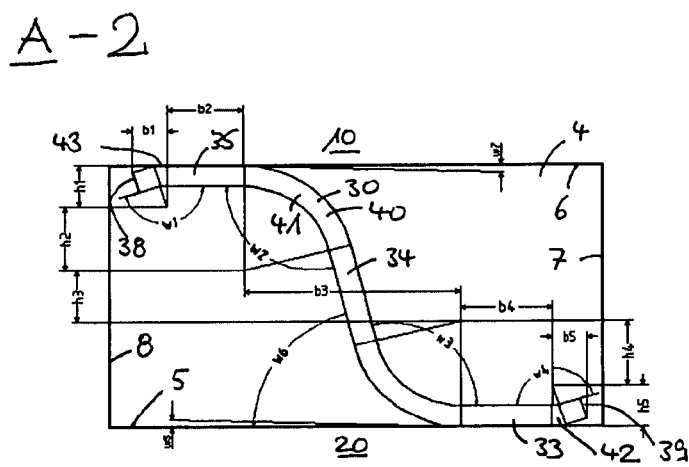
Fig. 4

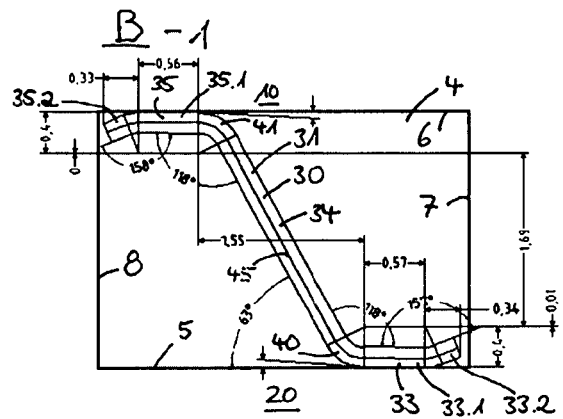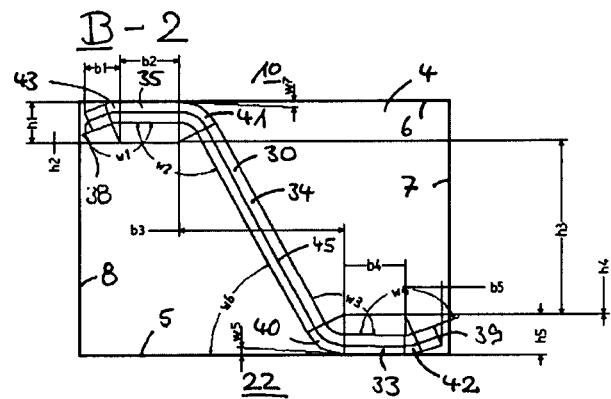
Fig. 4

|  | compressed state | | | | | non-compressed state | | | | |
|---|---|---|---|---|---|---|---|---|---|---|
|  | actual width | | range of nominal values | | | actual width | | range of nominal values | | |
|  | A | B | possible | preferred | particularly preferred | A | B | possible | preferred | particularly preferred |
| b1 | 0.31 | 0.33 | 0.20 - 0.5 | 0.20 - 0.5 | 0.25 - 0.4 | 0.20 | 0.20 | 0.1 - 0.5 | 0.1 - 0.5 | 0.1 - 0.3 |
| b2 | 0.71 | 0.56 | 0.3 - 1.2 | 0.3 - 1.2 | 0.4 - 1 | 0.62 | 0.54 | 0.25 - 1 | 0.25 - 1 | 0.4 - 0.7 |
| b3 | 1.97 | 1.55 | 0.8 - 3 | 0.8 - 3 | 1.2 - 2.5 | 2.11 | 0.86 | 0.6 - 6 | 0.6 - 6 | 0.8 - 2.5 |
| b4 | 0.83 | 0.57 | 0.3 - 1.2 | 0.3 - 1.2 | 0.4 - 1 | 0.56 | 0.54 | 0.25 - 1 | 0.25 - 1 | 0.4 - 0.7 |
| b5 | 0.31 | 0.34 | 0.2 - 0.5 | 0.2 - 0.5 | 0.25 - 0.4 | 0.20 | 0.20 | 0.1 - 0.5 | 0.1 - 0.5 | 0.1 - 0.3 |
|  | actual height | | | | | actual height | | | | |
| h1 | 0.4 | 0.4 | 0.1 - 0.85 | 0.1 - 0.7 | 0.3 - 0.5 | 0.40 | 0.40 | 0.1 - 1.0 | 0.1 - 0.7 | 0.3 - 0.5 |
| h2 | 0.62 | 0 | -0.2 - 1 | -0.2 - 1 | 0 - 0.8 | 0.83 | 0.25 | 0.15 - 1.5 | 0.15 - 1.5 | 0.2 - 1 |
| h3 | 0.48 | 1.69 | 0 - 2.5 | 0 - 2.5 | 0.4 - 1.8 | 0.74 | 2.11 | 0 - 3 | 0 - 3 | 0.5 - 2.5 |
| h4 | 0.61 | 0 | -0.2 - 1 | -0.2 - 1 | 0 - 0.8 | 1.02 | 0.25 | 0.15 - 1.5 | 0.15 - 1.5 | 0.2 - 1 |
| h5 | 0.4 | 0.4 | 0.1 - 0.75 | 0.1 - 0.7 | 0.3 - 0.5 | 0.40 | 0.40 | 0.1 - 1.0 | 0.1 - 0.7 | 0.3 - 0.5 |
|  | actual angle | | | | | actual angle | | | | |
| w1 | 162° | 158° | 145° - 165° | 145° - 165° | 150° - 162° | 162.00° | 155.00° | 145° - 168° | 145° - 165° | 150° - 162° |
| w2 | 105° | 118° | 95° - 135° | 95° - 135° | 105° - 125° | 115.00° | 122.00° | 100° - 140° | 100° - 140° | 110° - 130° |
| w3 | 105° | 118° | 95° - 135° | 95° - 135° | 105° - 125° | 115.00° | 122.00° | 100° - 140° | 100° - 140° | 110° - 130° |
| w4 | 162° | 157° | 145° - 172° | 145° - 165° | 150° - 162° | 162.00° | 155.00° | 145° - 170° | 145° - 165° | 150° - 162° |
| w5 | 1° | 1° | 0 ± 8° | 0 ± 8° | 0 ± 3° | 18.00° | 25.00° | 9.5° - 35° | 15° - 35° | 18° - 30° |
| w6 | 76° | 63° | 45° - 80° | 45° - 80° | 55° - 78° | 83.00° | 83.00° | 70° - 87° | 75° - 87° | 80° - 85° |
| w7 | 1° | 0.4° | 0 ± 8° | 0 ± 8° | 0 ± 3° | 18.00° | 25.00° | 12° - 35° | 15° - 35° | 18° - 30° |

Fig. 8

SEALING SYSTEM

BACKGROUND OF THE INVENTION

The invention relates to a sealing system consisting of a first part and a second part and at least a passage opening extending in both parts, in particular a passage opening for fluids such as hot combustion gases from combustion engines as well as a corresponding metallic flat gasket.

In the state of the art, on the one hand metallic flat gaskets are used between both parts which rest essentially with their full surface on both parts. The passage openings are then surrounded by elastic sealing elements, in most cases beads which are immediately formed into the metallic layer. They can be in the main force load so that they experience full compression, or they are in the secondary force connection, which is either realized by installation in a groove or by the integration of a deformation limiter in the gasket, so that they can only be compressed to the depth of the groove or to the effective height of the deformation element. This way, it is ascertained that the bead is preloaded in its elastic range only and even under load cannot get out of the elastic range.

With an installation over their full area, these gaskets always also comprise passage openings for fastening means, thus they are fastened between the two parts to be sealed against each other by screwing. One disadvantage resulting from this is the considerable demand in material as the gasket extends over a considerably large area compared to the actual area of the sealing lines. With parts showing several passage openings, an essential problem of this kind of gasket results from the different coefficients of thermal expansion of the parts to be sealed and the gasket. During a cold start in winter, thus e.g. at −20° C. the system shall be tight in the same way as after a longer operating phase with operation temperatures of more than 800° C. or with turbo-chargers of even 1000° C. This is counteracted by the large sections of material of the gasket connecting the passage openings which encounter different expansion than the parts to be sealed. The positions of the passage openings are thus shifted against each other which results in tensions and/or non-tightness. In addition, the adaptation to the movements of the sealing gap is strongly limited.

In addition, tubes with circumferential sealing structures are known from the state of the art. They seal the different passage openings independent of each other. They are however very complex in their production and often show precision problems. In particular, the production of the radially extending structures is very sensitive and often, small deviations in the dimensions of the part or of the sealing structures lead to considerable problems. Further, the gaskets are exposed to hot and aggressive fluids, in most cases combustion gases, over their entire length. In order to prevent corrosion, it is therefore necessary to use high-grade and therefore expensive materials. If both parts to be sealed move with a different degree, with multi-flow transitions, a destruction of the sealing pipes occurs as they cannot follow this movement.

Further, annular gaskets with c-, <- and ϵ-shaped profiles are used for the sealing of such sealing systems. They can however only be produced with considerable effort. For a seamless production, a multi-step process is required which further leads to an extreme deformation of the material. As an alternative, production from a flat metal sheet which is then closed to a ring is possible, but even with an extreme treatment always results in an inhomogeneity at the connection portion which can act as a rated break point and further can cause leakages. Further, these c-, <- and ϵ-profiled rings can only be produced in circular embodiments due to the rolling process finishing the production.

BRIEF SUMMARY OF THE INVENTION

It is therefore the object of the invention to provide for a sealing system, which guarantees a permanent sealing effect, which can be produced with little effort and which only encounters little wear by the passage of aggressive and hot media.

The solution of this object is achieved with the sealing system according to claim 1. Advantageous embodiments of the sealing system according to the invention are given in the dependent claims.

Thus, the present invention relates to a sealing system which comprises a first and a second part. The first and the second part in the operation state are compressed with each other at a joint contact face.

The first and the second part each comprise a passage opening in the contact face. This passage opening protrudes from the contact face into one of the parts or into both parts. The passage opening can also pass through one of the parts or through both parts.

Passage openings may for instance be fluid passage openings, in particular for combustion gases in internal combustion engines. They may also be realized as passage openings for axles or driving shafts, such as for a rotor shaft of an exhaust turbo charger.

An annular groove encircles the passage opening at a distance; the first and second part come to rest one on the other in the area outside the passage opening and in particular radially outside of the groove.

With the annular metallic flat gasket being installed into the annular groove, the contact surface between the first and the second part, which encircles the passage opening, is sealed.

This gasket comprises at least one metallic layer and in the compressed state the gasket or at least each of its layers—different from the gaskets in the state of the art—shows essentially only one layer in a top view, thus in a projection into a plane parallel to the contact surface. This means that the layer or the metallic flat gasket may not comprise any fold-over. In the same way, the gasket comprises no areas of its layers which extend orthogonally to the contact surface.

If nothing else is mentioned, the following explanations relate to sectional views of the sealing system according to the invention or of a metallic flat gasket according to the invention.

According to the invention, each of the metallic flat gaskets or each of its layers in the radial direction comprises an inner edge area, a central area and an outer edge area, which comprise different slopes and which pass over into one another via kinks. The kink between the inner edge area and the central area is oriented opposite to the kink between the central area and the outer edge area. Kinks in metallic layers are always characterized by a minimum radius, which results from the characteristics of the material and its thickness. The minimum radius of the outer contour at a kink in a typical metal sheet in a flat gasket ranges between 0.2 and 0.6 mm. The radius of the outer contour of such a kink is at the most 2 mm, preferably at the most 1.8 mm.

According to the invention, these three areas do not only comprise non-bending, straight sections. In particular the inner edge area and the outer edge area are formed in such a way that in the non-compressed state of the parts, they facially rest at least in areas to the head of the groove or the ground of the groove. Facial resting here means that the respective areas do not only form point- or line-shaped contact zones but facial contact zones.

With such a flat gasket both at the inner and at the outer edge area, a facial sealing zone is formed.

If the first part is compressed with the second part, then the flat gasket can be tilted, so that its radial extension in the plane of the contact zone becomes considerably longer. As a consequence, the contact zone between the flat gasket and the ground of the groove or the head of the groove, respectively, shifts.

Advantageously, the inner edge area and/or the outer edge area are subdivided into at least two individual non-bent sections, namely into a first straight area which is not bent in the radial direction and an inner or outer terminal area which is adjacent to the former in the direction of the inner or outer edge of the flat gasket. This section in the radial direction is not bent, neither. Both sections, the first area and the adjacent terminal area, pass over into one another via a kinking area. According to the invention, the flat gasket now can rest against the ground of the groove or against the head of the groove with its inner or outer terminal section if the parts are not compressed with one another or the sealing gap between these two parts is relatively large. If the two parts are strongly compressed with each other or the sealing gap between these two parts is small, then the flat gasket can rest against the ground of the groove or against the head of the groove with the first non-bent area, namely the first inner or outer straight area.

The sealing system according to the invention makes it now possible that with oscillations of the sealing gap between the first and the second part, the flat gasket rotates in such a way and at the same time elastically deforms in such a way that the resting area shifts between the first radially non-bent area and the inner or outer terminal area connected to the former via the kinking area. In a cross-section through the groove, a movement close to a rotation of the gasket around an axis takes place. In most cases, the movement is very complex and is not limited to a simple rotation around a single axis—even this axis being only the axis at a certain intersection plane—but dependent on the degree of compression, the rotation axis itself moves, too. If it was a pure rotation, one would have to imagine this axis as extending approximately centered in the layer extension of the flat gasket, e.g. at half the height of the flat gasket. If with the same state of compression, one considers a sectional view at a different point, a different rotation axis applies, which is however situated in the same plane as the first one. It is only shifted by the angle by which one has moved along the gasket or the groove, respectively. The flat gasket therefore changes its extension both in the radial direction and in the direction orthogonal to the contact surface. This rotational and tilting movement ascertains a permanent sealing of the passage opening. It shall once more be emphasized that this description of the rotational and tilting movement relates to the cross-section. The movement of the entire, annularly-closed gasket is very complex.

The groove of the sealing system can be formed into the first part or into the second part, onto which the respective other part rests facially. The groove may however also protrude beyond the contact surface so that it extends partly into the first part and partly into the second part. It is also possible that the groove is comprised in one of the parts with the other part showing a tongue in the area of this groove, which tongue protrudes into this groove and forms either a ground of the groove or a head of the groove. In the latter case, the effective height of the groove is smaller than the depth of the groove in an isolated single part when the tongue of the other part projecting into the groove is ignored.

The design of the metallic flat gasket as an annular gasket in the groove with different flat areas which are connected to each other via kinking areas has the function that a sufficient, advantageously a facial sealing zone, is maintained even with a cross-sectional tilting of the flat gasket. It is not provided in order to balance areas with different heights within a head of a groove or a ground of a groove but to equilibrate dynamical variations of the sealing gap. Moreover, both the head of the groove and the ground of the groove are advantageously formed without any radial and/or circumferential projections, crankings or shifts.

Advantageously, positioning devices or inserting aids may be provided at the inner or outer edge of the metallic flat gasket which facilitate the inserting of the flat gasket into the groove during the assembly and/or the centered fixation of the flat gasket in the groove during the assembly and during operation. To this end, two or more lugs are provided, which at the inner edge of the gasket protrude with an angle from the inner edge of the flat gasket. Such positioning devices or inserting aids have no direct sealing function but influence the sealing as they guarantee an optimal position of the gasket. The inserting devices may be designed e.g. in order to provide for a good resiliency. They may however also account for transport aspects in that they block any entangling of different gaskets.

Due to the installation of the flat gasket according to the invention in a groove, the area to be sealed even in the assembled state has not taken up any fastening means, such as screws, which connect the two parts and in cases further parts with each other.

According to the invention, the flat gasket may not only consist in a single metallic layer, but may consist in several metallic layers or comprise them. These layers can extend essentially parallel to each other. This way, they correspond to a duplication of the one-layered flat gasket. As an alternative, the two layers may however also touch each other at a certain radius around the center of the flat gasket and in one or both radial directions from this contact zone move away from each other. In the areas in which the two layers contact each other, they can also be connected to each other with various methods, such as for instance welding, roll threading, brazing or the like.

The metallic flat gasket according to the invention consists in a steel, in particular in a stainless steel or in a nickel-based alloy, in particular a so-called super alloy or contains such.

In the following, some examples of sealing systems according to the invention are given. The same or similar reference numbers are used for the same or similar elements and therefore, their description is in cases not repeated. In the following examples, a combination of the most varied characteristics of the sealing system according to the invention is illustrated. In cases, these characteristics are also suited to vary the present invention insulated from the other characteristics given in the respective example.

BRIEF DESCRIPTION OF THE DRAWINGS

It is shown in:

FIG. 2: An additional sealing system according to the invention in a cross-sectional view including two detailed views;

FIG. 3: Grooves of sealing systems according to the invention in cross section;

FIG. 4: Two different additional sealing systems in cross section;

FIG. 8: Advantageous ranges of values and values for individual dimensioning of the sealing systems shown in FIG. 4.

DETAILED DESCRIPTION OF THE INVENTION

Figure 1:
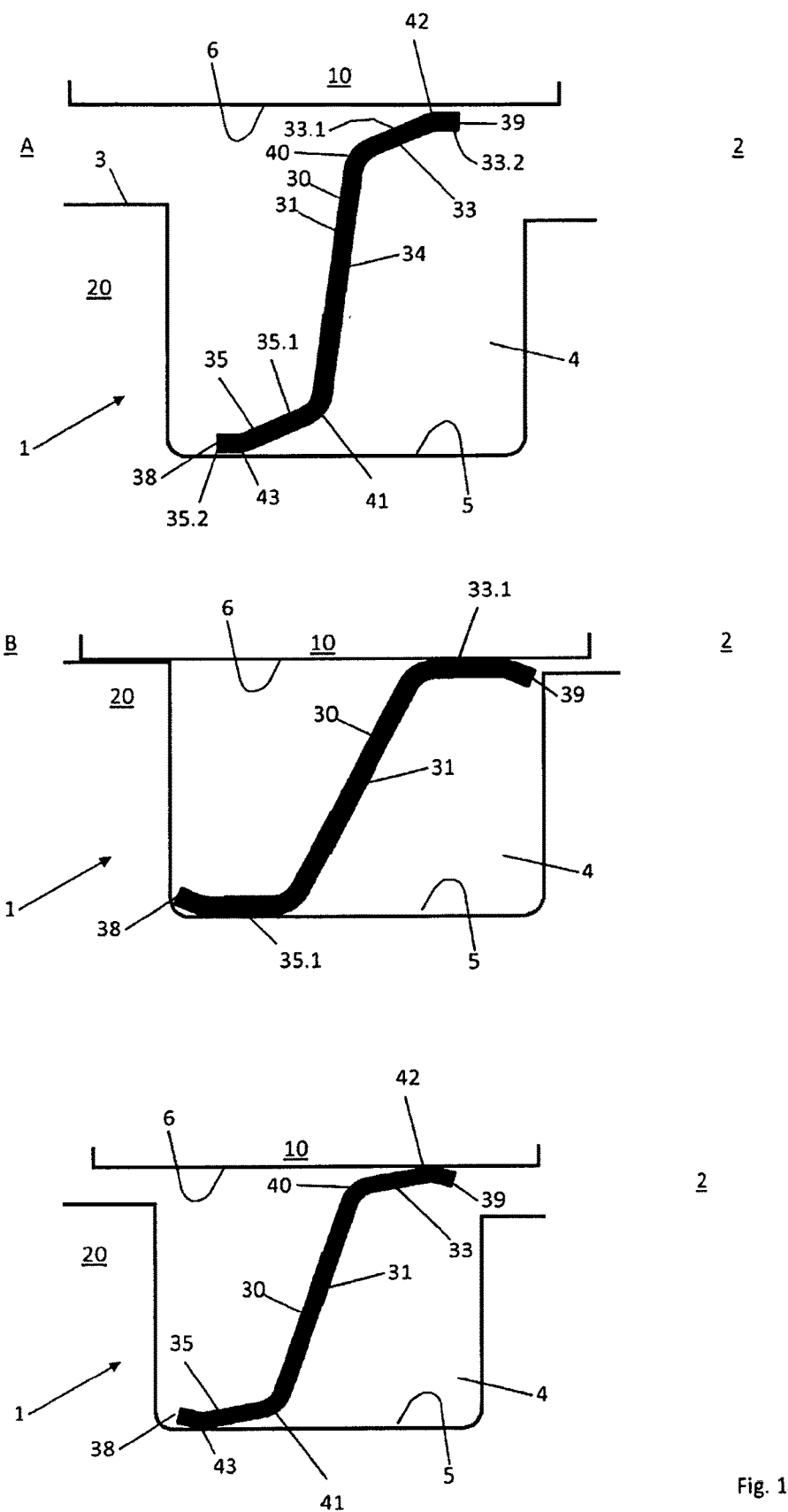
FIG. 1: A sealing system according to the invention in a cross sectional view.

FIG. 1 shows a sealing system 1 according to the invention which comprises two parts 10 and 20. In partial Figure A, these two parts 10 and 20 are shown in the non-compressed state so that they do not contact each other yet at the contact surface 3. In partial Figure B, these two parts 10 and 20 are compressed with each other and in partial Figure C, both parts 10 and 20 have slightly moved away from each other. In particular, Figures B and C represent two compression states of the sealing system and this way illustrate the oscillating movement of the sealing gap occurring during operation of the gasket in a schematically enlarged manner.

The part 20, e.g. a pipe guiding exhaust gas, shows a groove 4 with a bottom of the groove 5. This groove 4 in the mounted state is covered by the surface 6 of part 10 as a roof or head of the groove, e.g. by another exhaust-guiding pipe. The annular metallic flat gasket 30 according to the invention, which comprises a single metallic layer 31, is now inserted into the groove 4. The flat gasket 30 has to be imagined as surrounding a passage opening 2 situated on the right-hand side in FIG. 1A, e.g. an exhaust port 2. The exhaust port 2 is delimited by the cylinder head 10 and the exhaust manifold 20.

The flat gasket layer 31 comprises an inner edge area 33, a central area 34 and an outer edge area 35, which are connected to each other via kinking areas 40, 41. The inclination of the central area 34 relative to the ground of the groove 5 is larger than the one of the inner edge area 33 and of the outer edge area 35.

The inner edge area 33 is divided into a first straight inner area 33.1 and an inner terminal area 33.2, which are connected to each other via a kinking area 42. In the same way, the outer edge area 35 is divided into a first straight outer area 35.1 and an outer terminal area 35.2, which are connected to each other via a kinking area 43.

FIG. 1A shows the condition before the complete compression of the parts 10 and 20 against each other. In this condition, the inner terminal area 33.2 facially rests against the head of the groove 6 of the part 10. The outer terminal area 35.2 facially rests against the ground of the groove 5 of the part 20.

If the part 10 is now compressed with the part 20, see FIG. 1B, as this is for instance the case during the installation of the part, then the flat gasket 30 when it is considered in its cross-section is tilted, so that it now rests against the first inner area 33.1 at the head of the groove 6 and with the first outer section facially rests against the ground of the groove 1.

If the assembly in the further course encounters oscillations of the sealing gap, then the flat gasket 30 dependent on the space available may raise or lay down, so that the contact area between the inner edge area 33 and the head of the groove 6 as well as between the outer edge area 35 and the ground of the groove moves about the kinking areas 42 and 43. FIG. 1C shows the state with an enlarged sealing gap, thus the oscillating movement changes between the extreme states given in FIGS. 1B and 1C.

This way, a reliable sealing of a passage opening is possible with the sealing system according to the invention. In particular, the flat gaskets according to the invention have a high durability and permanent capacity, as the stress of the material only results from a rotation of the flat gasket around a kind of axis, when viewed in the cross-section. This prevents from too strong deformations of the layer 31 of the flat gasket 30 and this way avoids fatigue of the material.

FIG. 2-*a* shows a further sealing system 1 according to the invention for the sealing between a first part 10 and a second part 20. The FIG. 2-*a* illustrates the sealing system 1 in a partial and sectional view. In particular, the groove 4 is shown with a ground 5, an outer wall 8 and a head 6. A metallic flat gasket 30 according to the invention is now installed into this groove 4 as an annular seal. In the non-compressed state, as it is shown in FIG. 2-*a*, the height of the flat gasket 30 is larger than the effective height of the groove 4 after the compression of the parts 10 and 20.

In general, the flat gasket 30 is designed as in FIG. 1. In addition, several inserting devices 37 are arranged along the inner circumferential edge of the flat gasket at regular distances, one of which is visible at the section in FIG. 2-*a*. This inserting device can be formed as one part with the layer 31 of the metallic flat gasket 30 or be attached to the metallic flat gasket later on. The inserting device 37 consists in an angled bridge, which extends from the inner circumferential edge 39 of the first metallic layer 31 downwards or in the direction of the groove 4, respectively. During the installation of the metallic flat gasket 30, the inserting device is guided along the inner wall 7 of the groove. As these inserting devices 37 are arranged at regular distances along the inner circumferential edge of the layer 31, they also serve as centering elements for the flat gasket 30.

The bridge of the inserting device 37 comprises two sections 37.1 and 37.2, which are connected to each other via a kinking area 45. In an area 44, the inserting device is fastened to the inner circumferential edge of the gasket layer 31 of the flat gasket, or as is the case here, protrudes from the latter.

Both sections 37.1 and 37.2 are now linked to each other in such a manner that the kinking point 45—when viewed in radial direction—is located at the innermost position of the inserting device 37. Starting from this kinking point 45 of the inserting device 37, in the sectional view of the metallic flat gasket 30 given in FIG. 2-*a*, both areas 37.1 and 37.2 extend radially outwardly. When the flat gasket 30 is inserted into the groove 4, the kinking point 45 thus slides along the inner wall 7 of the groove and this way ascertains the correct positioning of the metallic flat gasket 30 in the groove 4.

FIGS. 2-*b* and 2-*c* show details of possible designs of the inserting device 37. The embodiment in FIG. 2-*b* has two essentially straight edges, while the embodiment in FIG. 2-*c* comprises a hook-like, angled lateral extension 37.4 attached to a single area 37.3. As already described, the embodiment shown in FIG. 2-*b* has an excellent resiliency and allows to optimally center the gasket 30 relative to the passage opening 2 as it allows for a resilient clamping of the gasket via the inserting device(s) 37. The embodiment in FIG. 2-*c* comprises a single area 37.3 which extends radially outward from the edge 39. Laterally to said area 37.3 an angled extension 37.4 is provided. This inserting device 37 has a slightly lower resiliency than the inserting device 37 in FIG. 2-*b*, but nevertheless allows to optimally position the gasket. It shows its advantages in particular during the transport of the flat gasket 30 as the angled lateral extension 37.4 prevents different flat gaskets 30 from getting entangled with each other. It also shows advantages during the production as it can be easily removed from the mold.

Both inserting devices 37 shown in FIG. 2-*b* and FIG. 2-*c* allow the gasket 30 to be installed from two directions, e.g. either the way they are indicated in FIGS. 2-*b* and 2-*c* or upside down without any disadvantage.

A further alternative for an inserting device consists in an inserting device, which is essentially similar to the inserting device 37 in FIG. 2-*c* but further is mirror symmetrized by having angled lateral extensions on both sides.

FIG. 3-*a* shows the formation of an annular groove through a first part 10 and a second part 20. In FIG. 3-*a*, the depth of the groove is exclusively formed in the second part 20.

Hg signifies the effective height of the groove and Bg the effective width of the groove. As can be seen in FIG. 3-*a*, the groove 4 encircles a central axis 9 in a circular symmetric manner with the central axis being the central axis of the passage opening 2, too.

FIG. 3-*b* shows a further embodiment of the annular groove 4 through a first part 10 and a second part 20. In FIG. 3-*b*, the groove is also only formed in the second part 20. The head of the groove is formed by the surface of the part 10. In contrast to the embodiment in FIG. 3-*a*, the area of the part 20 which is encircled by the groove is lowered with respect to its surface. Between the part 10 and the part 20, a gap with a height Hm is left free, which is annularly encircled and delimited by the groove 4. The passage opening is thus connected to the groove 4 via this gap in a manner that allows the passage of fluids. As the sealing of the passage opening is achieved by the flat gasket 30 according to the invention which is inserted into the groove 4, which in turn encircles the annular gap, the passage opening is nevertheless sealed off in a secure manner.

FIG. 3-*c* shows a further embodiment of an annular groove 4 in a first part 10 and a second part 20. In contrast to FIG. 3-*a*, the area of part 10 enclosed and surrounded by the groove 4 protrudes from the part 10 in such a way that the inner wall 7 of the groove is formed by the part 10 while the outer wall 8 of the groove is formed by the part 20.

FIG. 4 in partial Figures A and B shows two variants of a flat gasket 30 which according to the invention is inserted into a groove 4. In partial FIGS. 4A-1 and 4A-2, a flat gasket is installed, in which the transition radii between the areas 33 and 34 as well as between the areas 34 and 35 are larger than in the embodiment in FIGS. 4B-1 and 4B-2. One should take into consideration that in FIG. 4, other than in FIG. 1, the passage opening is given in the right part of the Figure. In partial FIGS. 4B-1 and 4B-2, in addition to the actual contour of the groove 4 and of the flat gasket 30, the neutral fiber 45 of the flat gasket's geometry is given.

Figure 5:
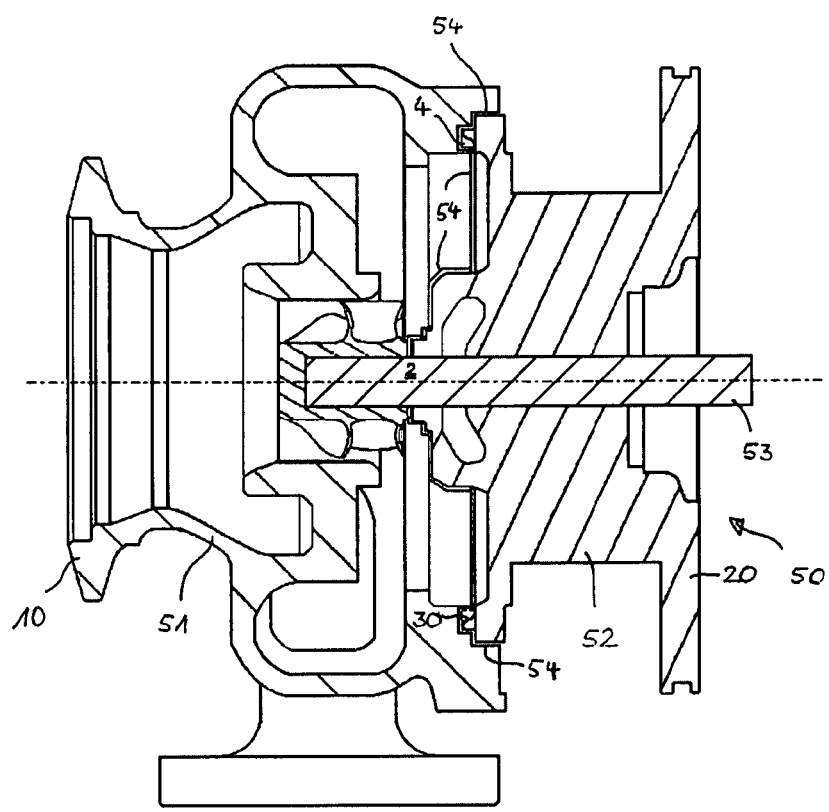
FIGS. 5 and 6: Two different additional sealing systems in cross section.

FIG. 5 shows the use of a sealing system according to the invention in an exhaust turbo charger 50. In this exhaust turbo charger 50, a turbine housing 51 as the first part 10 is arranged next to a bearing housing as the second part 20. In the bearing housing 52, a shaft 53 of the exhaust turbo charger 50 is seated. Both parts 51 and 52 are fastened one at the other along a surface of part 51 which is indicated with a double line in FIG. 5. In the center of the separation surface 54, a passage opening 2 is provided for the passage of the shaft 53. In order to seal the separation surface 54 in the area of the passage opening 2 for the shaft, a groove 4 is provided, which encircles the passage opening 2 at a distance, with a flat gasket 30 being inserted into the groove 4 according to the invention. The present example shows that the sealing system according to the invention can also be used to seal passage openings which are no fluid passage openings but passage openings for the passage of mechanical parts. FIG. 5 further shows that the groove 4 in the present invention does not need to be arranged in the immediate neighborhood of the passage opening 2, but may encircle the passage opening 2 at a distance.

Figure 6:
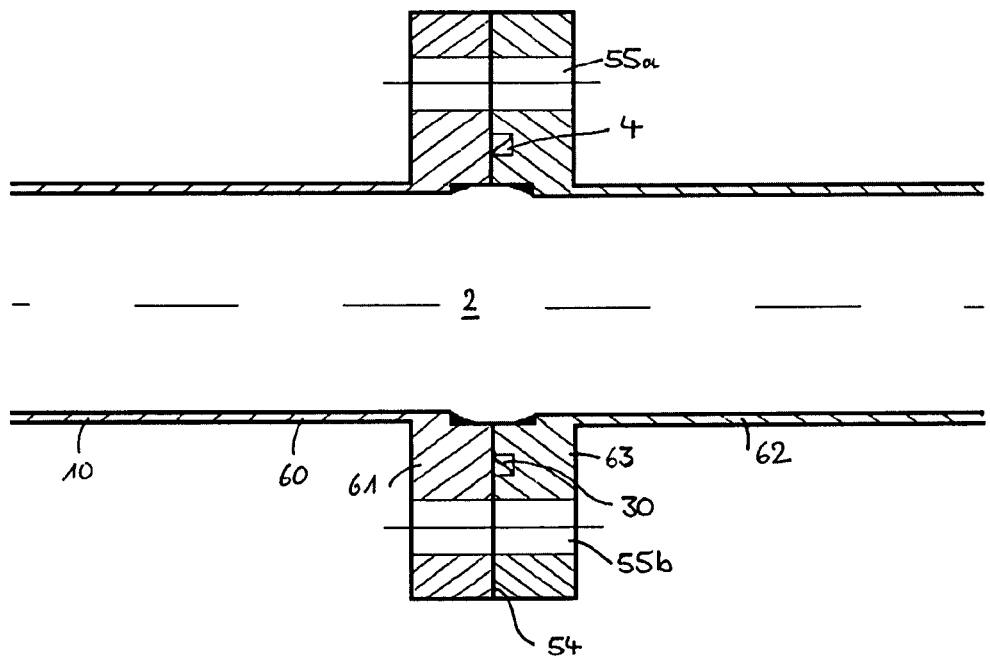

FIG. 6 shows the use of a sealing system according to the invention for the sealing of two pipes. A first pipe 60 with a flange 61 as a first part is connected to a second pipe 62 with a second flange as the second part 20 along a separation line 54. Both parts 10 and 20 form passage openings 2, so that fluids from the first pipe 60 can flow into the second pipe 62 and vice versa. This example sows the use of a sealing system according to the invention with a groove and a flat gasket 30 for an annular sealing of a fluid passage opening 2.

Figure 7:
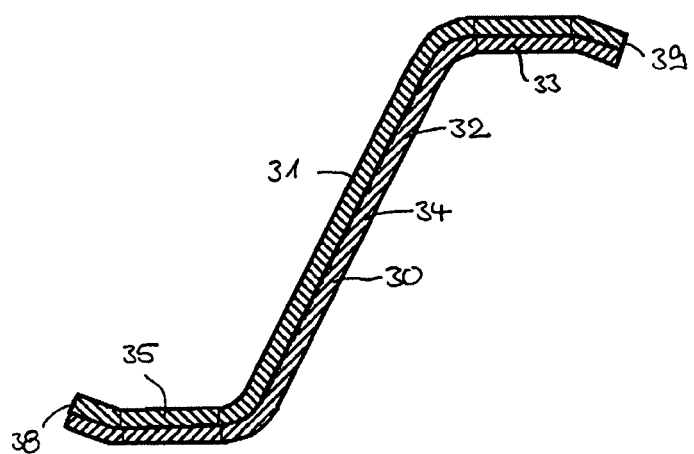
FIG. 7: A flat gasket of a sealing system according to the invention in cross section.

FIG. 7 shows a further example of a metallic flat gasket 30 according to the invention, which here consists in two metallic layers 31 and 32, which facially rest one on the other and which essentially run in parallel to each other. The first and the second metallic layers 31, 32 are thus formed as a compound, so that the metallic flat gasket 30 again comprises a central area 34 and adjacent to this an inner edge area 33 and an inner edge area 35. The further design of the flat gasket is comparable to the one of FIG. 1*a*.

FIG. 8 now shows dimensions for embodiments according to the invention, namely for flat gaskets used in the sealing system according to the invention shown in FIGS. 4A and 4B.

In addition to the actual values for the flat gaskets shown in FIG. 4, areas of the values are given, within which the respective values may range or should range with preference. The values are both given for the non-compressed state and the compressed state.

The values for each parameter in FIG. 8 may thereby be embodied independently of each other or in combination.

The actual values given in FIG. 8 for the width, height and angles of the flat gasket have obviously been chosen in such a manner that the embodiments selected in FIGS. 4A and 4B range in the particularly preferred range of the target values.

The invention claimed is:

1. A sealing system comprising:
   a first part and a second part, the first part having a first surface facing the second part and the second part having a second surface facing the first part, wherein, in contact with one another, the first surface and the second surface define a joint contact surface, wherein the first and second parts comprise
   at least one passage opening in the joint contact surface, wherein the at least one passage opening protrudes into at least one of the first and second parts,
   an annular groove, which is delimited by the first part and the second part and which encircles the passage opening, with the first part and second part in an area at least radially outside of the groove come to rest one on the other at the joint contact surface, wherein
   a metallic gasket, which extends annularly in the groove, with the metallic gasket comprising at least one metallic layer, said layer in a projection into a plane parallel to the joint contact surface of the first part and the second part show only one layer, and the metallic flat gasket in the radial direction sequentially comprises from the passage opening an inner circumferential edge, an inner edge area, a central area, an outer edge area, and an outer circumferential edge, wherein said inner circumferential edge faces the passage opening, and said outer circumferential edge faces away from the passage opening, wherein each area and edge is connected by a kinking area, wherein said inner edge area and the outer edge area are not bent, straight areas in contact with either a head of the groove or an opposite, but parallel, ground of the groove, said inner and outer edge areas are both parallel to the head and the ground of the groove.

2. The sealing system according to claim 1, wherein the inner edge area at its outer edge comprises an inner terminal area, which is not bent in the radial direction and which passes over into the first inner area via a kinking area, where in a non-compressed state of the parts, the inner terminal area rests essentially facially against the head of the groove or the ground of the groove and/or
the outer edge area at its outer edge comprises an outer terminal area, which is not bent in the radial direction and which passes over into the first outer area via a kinking area, where in the non-compressed state of the parts, the outer terminal area rests essentially facially against the head of the groove or the ground of the groove.

3. The sealing system according to claim 2, wherein the metallic flat gasket comprises no section which extends orthogonally to the contact surface of the first and the second part.

4. The sealing system according to claim 3, wherein the metallic flat gasket in the non-compressed state of the parts in a projection into the contact surface of the first and the second part comprises a radial extension, which is smaller than the radial extension of the groove and in the fully compressed state of the parts in a projection into the contact surface of the first and the second part comprises a radial extension which is larger than its radial extension in the non-compressed state.

5. The sealing system according to claim 4, wherein the flat gasket shows at least one of the following properties:
the relationship between the height of the flat gasket and the width of the flat gasket in the non-compressed state is ≤1.2 and/or
the flat gasket in the non-compressed state shows a height, which is larger than the effective height of the groove (Hg) by at least 500 µm; and/or
the radial extension of the flat gasket in the non-compressed state of the parts in projection into the plane of the contact surface ranges between 2 and 5 mm; and/or
it is axially symmetric relative to its outer shape and/or comprises no radial slits.

6. The sealing system according to claim 5, wherein the central area at least in sections comprises an inclination or descent where
the maximum slope of the central area, relative to the contact surface between the two parts in the non-compressed state or in a compressed state ranges between 80° and 85° and/or
the slope of the central area relative to the two adjacent edge areas in the non-compressed state shows different angles of slope.

7. The sealing system according to claim 6, wherein the flat gasket at its inner and/or outer edge comprises at least two inserting devices comprised of at least two lugs, with the inserting devices comprising straight lateral edges or at least one angled lateral projection pointing towards the central area of the gasket.

8. The sealing system according to claim 7, wherein the flat gasket comprises at least two layers where
the radial extension of two adjacent layers is essentially parallel to each other or
the radial course of two adjacent layers is symmetric relative to a central plane between the two layers; and/or
the two layers at their inner edge areas contact each other and/or are connected to each other and/or
at least two of the layers are comprised of different materials, with different thermal expansion coefficient, are facially connected to each other by roll threading.

9. The sealing system according to claim 1, wherein the flat gasket is exactly one layer.

10. The sealing system according to claim 1, wherein the flat gasket in its entirety or one of its layers comprises a steel, or a nickel-based alloy.

11. The sealing system according to claim 1, wherein the head of the groove and/or the ground of the groove only comprise such surface which extend parallel to the plane of the adjacent areas of the contact surface and/or comprise no steps.

12. The sealing system according to claim 11, wherein a radial cross-section of the groove and a radial cross-section of the flat gasket and/or one of its layers, respectively, comprises no aligned radial extension but a diverging radial extension.

13. The sealing system according to claim 11, wherein the groove has
a width Bg with 3.3 mm≤Bg≤5.3 mm; and/or
a height Hg with 2 mm≤Hg≤2.6 mm; and/or
an inner diameter of its inner edge Di with preferably Di≥45 mm; and/or
lateral walls between the head of the groove and the ground of the groove which extend orthogonally to the plane of the adjacent areas of the contact surface.

14. The sealing system according to claim 1, wherein the passage opening is a fluid passage opening for combustion gases of combustion engines or a passage opening for the passage of a shaft.

15. The sealing system according to claim 1, wherein said inner edge area and said outer edge area, in a compressed state, are parallel but non-planar with one another.

16. The sealing system according to claim 1, wherein the annular groove is separated from the passage opening by a portion of the contact area.

* * * * *